Sept. 4, 1928.
R. A. MILLER
PLANT PROTECTOR
Filed Feb. 28, 1927
1,683,043
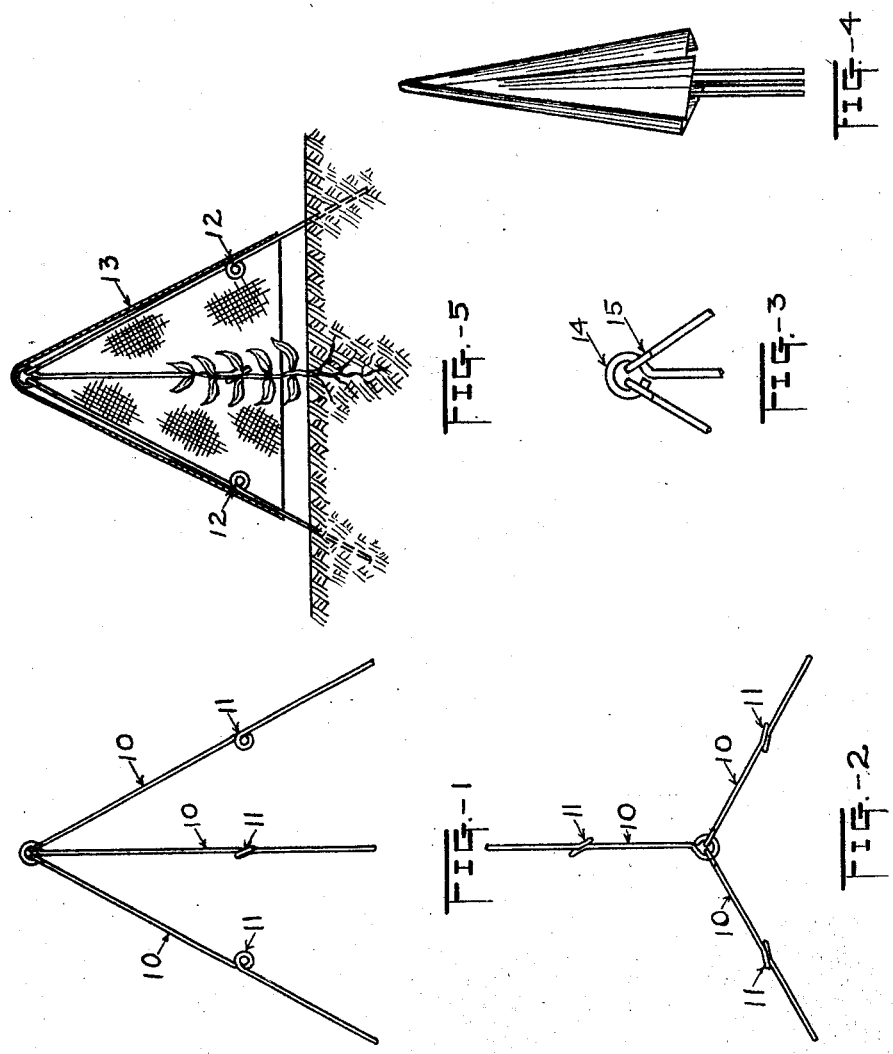
INVENTOR
Robert A. Miller
PER
Jeff and Jeff
ATTORNEYS Patented Sept. 4, 1928.

1,683,043

UNITED STATES PATENT OFFICE.

ROBERT A. MILLER, OF PEKIN, ILLINOIS.

PLANT PROTECTOR.

Application filed February 28, 1927. Serial No. 171,429.

This invention relates to collapsible plant protectors.

One of the objects of the invention is in the provision of a plant protector adapted to collapse in such manner as to permit a gardener to carry a large number in his arm during the gardening operation, thereby saving considerable time in the plant-covering operation.

Another object is in the provision of a plurality of rod members having their plural end portions attached in such manner that they are not only adapted to collapse but also to receive a plant covering fabric thereon, said covering being also adapted to collapse with said rod members into a very small space.

Still another object is in the provision of plural rod members, and a covering therefor, said rod members being connected at their upper ends in such manner that they are capable of being either extended to a plant covering position, or collapsed in such manner that a gardener may carry a large number in his arm during the gardening operation.

A further object lies in the provision of a simple plant protector device, the same comprising three rod members attached in such manner at their upper ends that they may be collapsed, a flexible covering for said rods providing a protecting means for young plants, attachment means being provided on the rod members, to which attachment means the fabric may be suitably fastened.

Other objects will appear in the following specification, taken in connection with the annexed drawings, in which—

Fig. 1 is a side elevation showing the plurality of rod members of the plant protector in an extended position;

Fig. 2 is a plan view, from above, of the parts shown in Fig. 1;

Fig. 3 is an enlarged detail of the connecting means for the upper ends of the rod members;

Fig. 4 is a perspective view showing my plant protector in a collapsed position; and Fig. 5 is a side elevation, partially in section, showing the manner of disposing my plant protector over the young plant and the position same assumes with relation to the ground.

Before referring specifically to the drawings, it might be stated that applicant has had a great many years experience in gardening, and has found that due to climatic conditions he was unable to get upon the market with his produce until about the same time as all other gardeners in his locality, because of the fact that weather conditions necessitate planting by all gardeners at about the same time.

At one time or another, applicant has covered young plants by means of boxes, bottles, cans, etc. to protect them from the elements, but such means for protecting same was accompanied by many difficulties, in view of the fact that it was impossible for him to carry such type of protector devices in sufficient numbers in his arm as he moved from plant to plant.

Applicant also had knowledge of plant protector means comprising rod members that were covered by either fabrics or other material, which were adopted to be placed over young plants. However, even with the knowledge of such devices, he still considered same unsuited for his work, in view of the fact that he was cultivating a large number of plants, and it was necessary not only to protect same, but to accomplish this protection quickly.

Applicant finally devised the present plant protector device, which he found would not only permit him to plant several weeks earlier than other gardeners, thus insuring an earlier production, and therefore enabling him to obtain a higher price for his produce, but also to accomplish this plant protection in a short time, in view of the fact that he was able to carry a great number of his plant protector members in his arm as he moved from one plant to another.

In the drawings, there is shown a plurality of rod members 10 having the attachment members or loop members 11 formed integrally therewith, as may be clearly seen in the drawings, said members 11 being adapted to receive any suitable attachment means, such as a string 12, that is also connected to a fabric covering portion 13. This fabric covering is flexible, and is disposed over the plurality of rod members in the manner clearly shown in Fig. 5.

The upper ends of the plural rods 11 are connected in the manner shown perhaps most clearly in Fig. 3, where one of the rods is shown with the eye portion 14 and the adjacent rod members having the smaller eye portions which engage the first mentioned eye portion 14, said engagement permitting collapsing of the rods to a position shown most clearly in Fig. 4, where same assume substantially parallel positions and lie one against the other.

The flexible fabric 13, when said rods are in collapsed position, also collapses in the manner shown in Fig. 5 and may be folded tightly about the rod members in such manner that the plant protector will assume a very small space, at least as respects its extended or operative position, as shown in Fig. 5. The operator, as may be clearly seen, may carry in his one arm a considerable number of these plant-protector members, and with his other hand place same over the young plants, forcing the lower ends of the rods 10 firmly into the ground at spaced distances about the plant.

In this manner, the plants may be protected from adverse climatic conditions and not only save same from perishing under certain conditions, but also permits planting thereof at such a date that if not properly protected, they could not possibly survive.

In view of the above description, the operation of the plant-protector device is thought sufficiently clear.

What I claim is:

1. In a plant protector, a plurality of rod members, means for connecting same at their upper ends in a manner to permit collapse thereof to a position where they lie adjacent each other, comprising an enlarged eye portion for one of the rods and smaller eye portions for the adjacent rods, said portions being adapted to engage the first named enlarged eye portion, and a flexible detachable covering for the rods adapted to fold tightly about the rod members when in their collapsed position.

2. A plant protector frame, comprising a plurality of rod members each having a loop member formed intermediate its ends, one of said rod members having an enlarged eye portion formed on its upper end, the remainder of said rod members each having its upper end formed with an eye portion of smaller diameter than the first named eye portion and inter-engaged with the latter whereby the rod members may be moved to a position adjacent to and substantially parallel with each other to collapse the frame, and a flexible covering disposed over the frame and connected to the intermediate loop portions of said members to permit the same to be folded about the rod members when the frame is collapsed.

In testimony whereof I have hereunto affixed my signature.

ROBERT A. MILLER.